(12) United States Patent
Dulac

(10) Patent No.: US 9,082,302 B2
(45) Date of Patent: Jul. 14, 2015

(54) METHOD AND DEVICE FOR AIDING THE PILOTING OF AN AIRCRAFT DURING AN INTERMEDIATE APPROACH PHASE OF A DESCENT

(75) Inventor: Clément Dulac, Toulouse (FR)

(73) Assignee: Airbus Operations SAS, Toulouse Cedex (FR)

( * ) Notice: Subject to any disclaimer, the term of this patent is extended or adjusted under 35 U.S.C. 154(b) by 203 days.

(21) Appl. No.: 13/467,466

(22) Filed: May 9, 2012

(65) Prior Publication Data

US 2012/0290155 A1    Nov. 15, 2012

(30) Foreign Application Priority Data

May 12, 2011    (FR) ...................... 11 54125

(51) Int. Cl.
*G05D 1/06* (2006.01)
*G08G 5/02* (2006.01)

(52) U.S. Cl.
CPC .............. *G08G 5/025* (2013.01); *G05D 1/0676* (2013.01); *G08G 5/02* (2013.01)

(58) Field of Classification Search
CPC ..... G08G 5/0039; G08G 5/02; G05D 1/0202; G05D 1/0676
USPC ..................... 244/183, 186; 701/18
See application file for complete search history.

(56) References Cited

U.S. PATENT DOCUMENTS

| 3,666,929 | A | * | 5/1972 | Menn .............................. 701/16 |
| 4,825,374 | A | | 4/1989 | King et al. |
| 6,154,693 | A | * | 11/2000 | Aberschitz et al. ............. 701/16 |
| 2006/0273928 | A1 | | 12/2006 | Van Boven |
| 2010/0125382 | A1 | * | 5/2010 | Wachenheim et al. ......... 701/18 |

OTHER PUBLICATIONS

French Patent Office, Preliminary Search Report for FR 1154124, Nov. 30, 2011 (2 pgs.).

* cited by examiner

*Primary Examiner* — John Q Nguyen
*Assistant Examiner* — Anshul Sood
(74) *Attorney, Agent, or Firm* — Wood, Herron & Evans, LLP

(57) ABSTRACT

A method and device for aiding the piloting of an aircraft during an intermediate approach phase of a descent. The method includes receiving, by a flight management system, values of parameters relative to the aircraft and a flight thereof, and determining, by the flight management system and based on the received values, a vertical profile. The vertical profile includes at least one deceleration segment with an adaptive slope, which defines a descent path that enables the aircraft to hold a constant deceleration rate during the intermediate approach phase. The method also includes guiding, by an aircraft guidance system, the aircraft according to the vertical profile during the intermediate approach phase such that the aircraft holds the constant deceleration rate during the intermediate approach phase.

11 Claims, 2 Drawing Sheets

METHOD AND DEVICE FOR AIDING THE PILOTING OF AN AIRCRAFT DURING AN INTERMEDIATE APPROACH PHASE OF A DESCENT

TECHNICAL FIELD

The present invention relates to an aiding method and device for piloting an aircraft, in particular a transport airplane, upon an intermediate approach phase during a descent of the aircraft, including with a view to a landing on an airport.

BACKGROUND

It is known that, upon a landing, an airplane loses in altitude and reduces its speed for switching from cruising flight conditions to landing conditions. During its descent, the airplane takes various aerodynamic configurations. Upon a cruising flight, the external surface of the airplane is the smoothest possible. When it is coming close to the ground, various steps are provided, during which the flaps and slats are opened. Usually, an airplane comprises at least three distinct opening configurations for the flaps and slats.

Moreover, upon the approach, the airplane generally follows a vertical profile including altitude levels, during which decelerations are performed.

In order to decrease the sound nuisance upon a landing, it is known to perform a Continuous Descent Operations ("CDO") approach type. Such an approach does not include any deceleration level at a constant altitude, but the airplane decelerates in the same time it is descending, and the descent is calculated so as to intercept a descent aligning segment of the airport, without any level.

A CDO type approach thus consists in eliminating the usual levels so as to enable the airplane to fly higher and with weaker thrust levels.

Presently, such approach type is only validated and implemented for weak traffic densities.

The object of the present invention is to aim at implementing such concept upon denser traffic periods, without for all that degrading capacity and safety.

The method usually used by the air control centre to manage the separation between airplanes is the so-called vectoring, which corresponds to using heading and/or speed instructions. With this end in view, in the framework of the air traffic, a new aiding function for the airplane separation is developed so as to come closer to the theoretical Terminal Maneuver Area ("TMA") capacity, the so-called function Airborne Separation Assistance System Spacing Sequencing and Merging ("ASPA S&M").

The object of the function ASPA M&S is to improve the capacity and regularity of the air traffic by decreasing the work load of the controller without increasing the one of the crew. To reach such objective, an airplane must obtain a time separation instruction behind another airplane, a so-called leader airplane, and hold such time separation automatically with a fixed tolerance. Data enabling to determine a target speed being necessary for the guidance are transmitted to the separation aiding system. Such target speed is then used for performing the guidance. Such data being used to calculate the speed adjustment must be memorized, as the object is to be on each past position of the leader airplane with a time offset equal to the separation being required.

The implementation of such a function ASPA S&M presents an acquisition phase, during which the separation required relative to the leader airplane is acquired, this separation being then to be held after the acquisition thereof. In order to hold such separation, the position, the speed and the acceleration of the follower airplane and the leader airplane are linked by a dynamic law. Such maneuver thus consists in acquiring and then holding a time separation (at the latest at the end of a given duration or at the latest on a given point, according to the maneuver instructed by the controller), and holding it within a given tolerance by acting on the speed while following the flight plan.

The disadvantage of such a function ASPA S&M is that it involves for the follower airplane (if the performances thereof are different from those of the leader airplane) go-around thrusts and the height and speed profile being left, which has been optimized by the flight management system of the Flight Management System ("FMS") type as a function of the airplane performances, of forgotten constraints and of weather forecast. Thus, the optimized initial profile of the follower airplane (such as calculated by the system FMS) is degraded due to the constraints generated by the follow-up of the leader airplane.

Moreover, some limitations are predicted for the implementation of a function ASPA S&M, requiring specifically:
  aircrafts with similar performances;
  identical side flight plans; and
  an autopilot and an auto-throttle engaged.

The implementation of such a function can thus lead to negative environmental impacts for an isolated flight.

The invention has as an object to define an adaptive vertical profile so as to limit the impacts of the function ASPA S&M and thus enable a use of a CDO type approach upon a dense traffic.

The present invention more particularly relates to an aiding method for piloting an aircraft, including a transport airplane, upon an intermediate approach phase of a descent of the aircraft, enabling to remedy the above mentioned disadvantages.

SUMMARY OF THE INVENTION

With this end in view, according to the invention, said method is remarkable in that it may include the following steps:
  (a) the values of the parameters relative to the aircraft and the flight thereof are received;
  (b) with the help of such predetermined values and performances of the aircraft, for at least said intermediate approach phase, a vertical profile is determined, which comprises at least one deceleration segment with adaptive slope, and which is such that it allows the aircraft to hold a constant deceleration rate during said intermediate approach phase; and
  (c) such a vertical profile is used so as to aid the aircraft piloting upon said intermediate approach phase.

Thus, thanks to the invention, a vertical profile is defined allowing the aircraft to hold a constant deceleration rate during the whole intermediate approach phase. Such (nominal) theoretical rate can for example be defined from the corrected speed of the Calibrated Air Speed ("CAS") type, a true speed of the True Air Speed ("TAS") type or a ground speed, and its value can for example be close to −4 kts/10 sec so as to allow for a comfortable deceleration. Said vertical profile can then be used on different ways (detailed with precision hereinunder) for aiding the aircraft piloting upon said intermediate approach phase.

If the invention is implemented on several aircrafts which follow each other, and that a common deceleration rate is provided for all these aircrafts, it is possible to hold a separation in constant time between the latter. The invention thus allows the improvement of the compatibility of a CDO type approach with a function ASPA S&M while providing a common deceleration rate for all the aircrafts in an intermediate approach phase. The tactical orders (of the air control centre ("ATC") or of the function ASPA S&M) to hold the separation between the aircrafts thus present a reduced impact on the flied path, relative to a usual implementation. Consequently, at the level of an aircraft fleet, a reduced impact of the function ASPA S&M on the environment can be expected.

So that the concept according to the invention, the so-called Adaptive Flight Path Angle ("A-FPA"), can operate, there is a need of:
- a new type of procedure published upon the approach (including deceleration rate constraints); and
- a situation where all the aircrafts being involved are able to fly such procedure type (i.e. the capacity of the aircraft to hold a constant deceleration rate in a descent), whatever the way to arrive at.

In the framework of the present invention, said vertical profile can include:
- either a unique non linear deceleration segment, for which the slope is adapted on a continuous way;
- or a succession of linear (rectilinear) deceleration segments, a particular slope that the aircraft must observe being associated with each of said deceleration segments.

Furthermore, advantageously, said parameters, the values of which are received at step (a), described above, comprise at least some of the following data:
- the aerodynamic configuration of the aircraft;
- the speed of the aircraft;
- the mass of the aircraft; and
- the environmental conditions, in which the flight of the aircraft is performed.

Thus, for each segment of the intermediate approach phase, amongst the three variables speed, thrust and slope, the speed and the thrust are fixed, and the slope (FPA) is adapted to the targeted deceleration and to the different flight conditions (speed, aerodynamic configuration, weather forecast and aircraft mass).

Moreover, advantageously:
- step (b), described above, is implemented through means making part of a flight management system of the FMS type of the aircraft; and
- said intermediate approach phase starts when the aircraft reaches, upon a descent, a position, in which it presents predetermined deceleration capacities, and ends when a landing path of a final approach phase is reached.

In a first embodiment, said steps (a) and (b) are implemented before flying the aircraft according to said intermediate approach phase, so as to perform a prediction of a vertical profile.

Moreover, in a second embodiment, at least said step (b) (in real time) is directly implemented during the aircraft flight according to said intermediate approach phase, and, at step (c), described above, the aircraft is guided so that it observes the vertical profile being determined in real time at step (b).

In this second embodiment, if, upon an intermediate approach phase, during which the aircraft is guided so that it observes the vertical profile being determined in real time at step (b), another guiding function is engaged, for example a function ASPA S&M, advantageously, the guidance according to said vertical profile is suspended, and the aircraft is only guided according such other function of guidance. In this case, imposed constraints (altitude or speed) have thus priority with respect to a targeted deceleration.

Therefore, when upon an intermediate approach phase, during which the aircraft is guided so as to observe the vertical profile, the function ASPA S&M is engaged, it exceeds the published constraint of deceleration. In this case, the function ASPA S&M only has generally a minimum impact and is only used to adjust the speed of the follower aircraft with respect to the leader aircraft, for small deviations caused by slight prediction errors.

The present invention also relates to an aiding device for piloting an aircraft, in particular a transport airplane, upon an intermediate approach phase of a descent of the aircraft, including with a view to a landing on an airport.

With this end in view, said device is remarkable in that it comprises:
- first means for receiving the parameter values relative to the aircraft and the flight thereof;
- second means, which are part preferably of a flight management system and determine, for at least said intermediate approach phase, with the help of such predetermined values and performances of the aircraft, a vertical profile comprising a succession of deceleration segments with an adaptive slope, a particular slope that the aircraft must observe being associated with each of said segments of deceleration, and which is such that it enables the aircraft to hold a constant deceleration rate during said intermediate approach phase; and
- third means using such vertical profile to aid aircraft piloting upon said intermediate approach phase.

The present invention also relates to an aircraft, in particular a transport airplane, being equipped with a device such as the above-mentioned device.

BRIEF DESCRIPTION OF THE DRAWINGS

The FIGS. of the accompanying drawings will make better understood how the invention can be implemented. On the FIGS, identical references designate similar elements.

DETAILED DESCRIPTION

Figure 1:
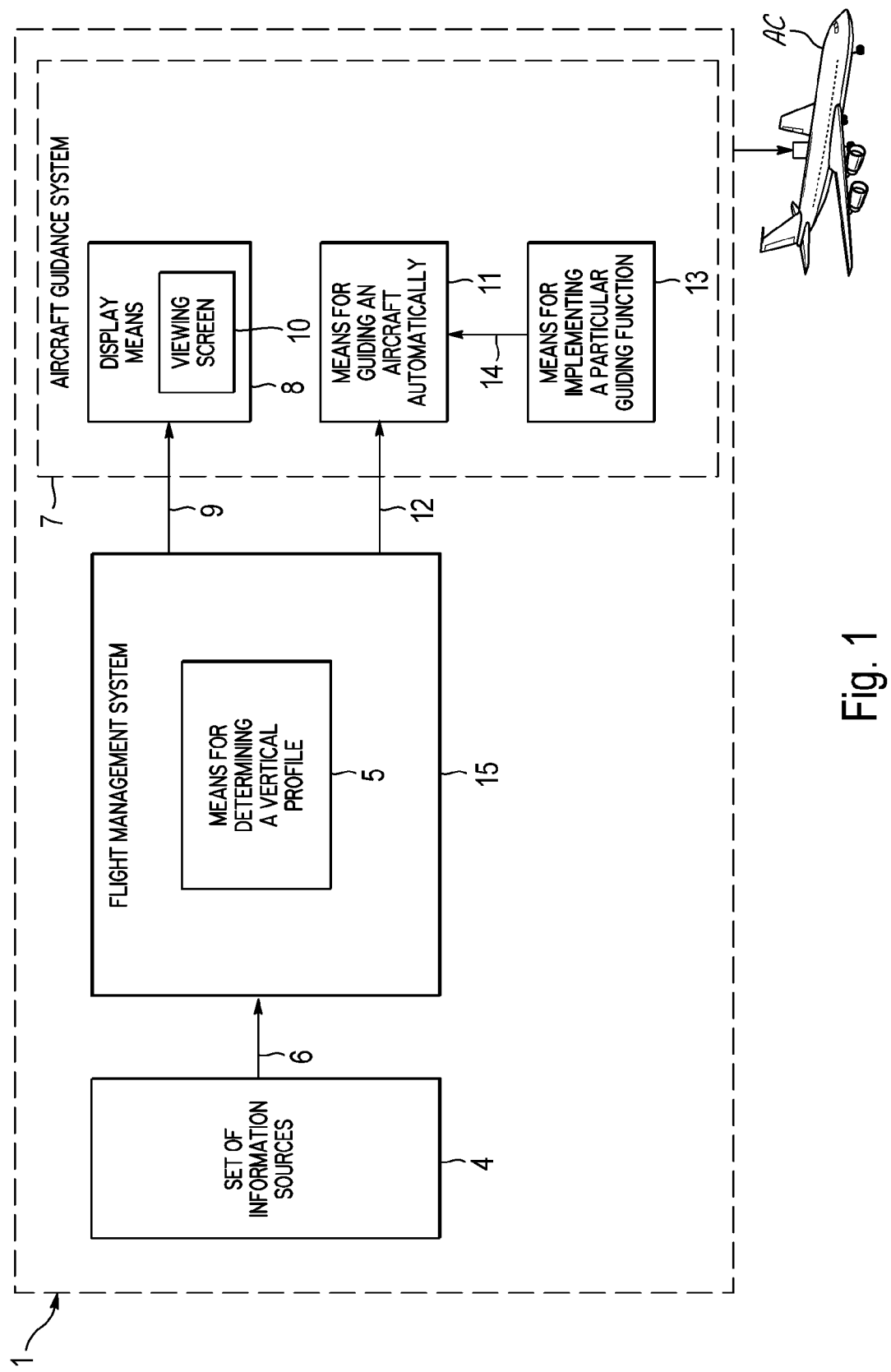
FIG. 1 is the block diagram of an aiding device for the piloting according to the invention.

The device 1 according to the invention and schematically represented on FIG. 1 is intended to aid the piloting of an aircraft A, in particular a transport jumbo jet, upon a descent of such aircraft, including with a view to a landing on a runway 2 of an airport.

Figure 2:
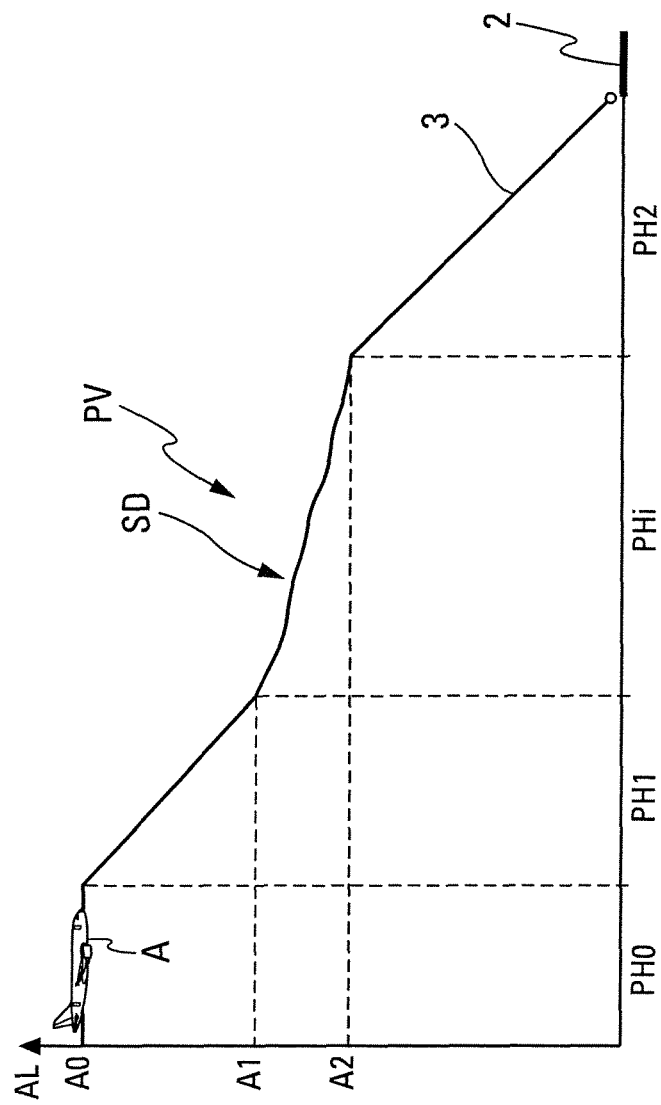
FIG. 2 shows schematically a vertical profile followed by an aircraft upon the descent of the aircraft with a view to a landing.

More precisely, said device 1 is intended to aid the piloting of the aircraft A upon an intermediate approach phase PHi which, as represented on FIG. 2,
- starts when the aircraft A reaches, upon the descent, predetermined deceleration capacities, at an altitude A1; and
- ends when a landing path 3 of a final approach phase PH2 is captured, at an altitude A2.

On FIG. 2, there is represented in addition:
- the end of a usual flight level PH0 at an altitude A0, for example 10,000 feet;
- a first approach phase PH1, after the level PH0 and before the intermediate approach phase PHi, which is generally flied at a constant speed; and
- said final approach phase PH2 (after the intermediate approach phase PHi), during which the aircraft A is guided along the landing path 3 with no level.

According to the invention, said device 1 comprises:
- a set 4 of information sources being detailed hereinunder, enabling to determine and/or to provide the flight parameter values of the aircraft A;
- means 5 which are connected through a connection 6 to said set 4 of information sources, being preferably part of a flight management system 15 of the FMS type and which are formed so as to determine, for at least said intermediate approach phase (PHi), with the help of the values received from the set 4 and predetermined performances of the aircraft A, a vertical profile PV; and
- an aircraft guidance system 7 using such vertical profile PV for aiding the piloting of the aircraft A upon said intermediate approach phase PHi.

According to the invention, such vertical profile PV comprises at least one deceleration segment SD with an adaptive slope. Such slope is defined so that said vertical profile PV, if it is followed, allows the aircraft A to hold a constant deceleration rate during said whole intermediate approach phase PHi.

In a preferred embodiment, as represented on FIG. 2, said vertical profile comprises only one non linear deceleration segment SD, for which the slope is adapted on a continuous way.

Moreover, in another (not represented) embodiment, said vertical profile PV comprises a succession of (rectilinear) deceleration segments with an adaptive slope. In that case, a particular slope, that the aircraft A must observe, is associated with each of said successive deceleration segments.

The slope (FPA) on the trajectory is adapted to the desired deceleration rate upon the phase PHi (geometrical points defined by the procedure and the published constraints). The resulting slope predicted by the means 5 is adapted to the performances of the aircraft A, as a function including of its aerodynamic configuration, its airplane mass, and the day conditions (weather forecast). The path is thus discretized so as to enable to hold an instantaneous deceleration rate close to the desired nominal value.

Such (nominal) deceleration rate can for instance be defined from a corrected speed CAS, a true speed TAS or a ground speed, and its value can for example be close to −4 kts/10 sec so as to allow for a comfortable deceleration.

Said vertical profile PV can then be used on different ways (detailed hereinunder) for aiding the piloting of the aircraft A upon said intermediate approach phase PHi.

Moreover, if the device 1 is installed on several aircrafts A which follow each other, and that a common deceleration rate is predicted for all these aircrafts A, it is possible to hold a separation in constant time between the latter. The devices 1 according to the invention thus enable to improve the compatibility of a CDO type approach with a function ASPA S&M by providing a common deceleration rate for all the aircrafts A in an intermediate approach phase. The tactical orders (of the ATC or of the function ASPA S&M) to hold the separation between the aircrafts A thus presents a reduced impact on the flight path, with respect to a usual implementation. Consequently, at the level of an aircraft fleet, a reduced impact of the function ASPA S&M on the environment can be expected.

So that the concept according to the invention, a so-called "A-FPA" (for "Adaptive Flight Path Angle") concept can operate, it is necessary that:
- a new type of procedure is published upon the approach (including a deceleration rate constraint); and
- all the aircrafts being involved are equipped with said concept.

Furthermore, the parameters, the values of which are supplied by the set 4 and used by the means 5, comprise at least some of the following data:
- the aerodynamic configuration of the aircraft;
- the speed of the aircraft;
- the mass of the aircraft; and
- environmental conditions (wind, etc.), in which the flight of the aircraft is performed.

The values of said parameters can be input in the device 1:
- either manually by a crew member, through usual input means, in particular a keyboard and/or a mouse associated for example with a display screen, being part of said set 4;
- or automatically, for example through a data transmission connection linking the information sources of the set 4 to the device 1.

For each segment SD of the intermediate approach phase PHi, amongst the three variables speed thrust and slope, the speed and the thrust are fixed, and the slope (FPA) is adapted for the targeted deceleration and the different flight conditions (speed, aerodynamic configuration, weather forecast).

FIG. 2 shows that the present invention uses a deceleration in an adaptive slope so as to hold a constant deceleration rate (successive segments SD), instead of using a deceleration by an energy exchange (kinetic energy [speed] and potential energy [altitude]) in a descent mode such as upon a usual CDO procedure.

In a first embodiment, said device 1 determines the vertical profile PV before flying the aircraft A according to said intermediate approach phase PHi, with the help of predicted values concerning including the weather forecast or the speed. In such first embodiment, the device 1 thus performs a prediction of the vertical profile PV, and said means set can include display means 8 which are connected through a connection 9 to said means 5 and are formed so as to present to the pilot of the aircraft A, on a viewing screen 10, the characteristics of said vertical profile PV.

With this end in view, the device 1 predicts in advance the vertical profile PV allowing the aircraft A to hold a nominal deceleration rate which can be published in a navigation data base Navigation Data Base ("NDB"). As indicated above, the nominal deceleration rate can for example be defined from a corrected speed CAS, a true speed TAS or a ground speed, and its value can for instance be close to −4 kts/10 sec so as to enable a comfortable deceleration.

Moreover, in a second embodiment, said device 1 determines the vertical profile PV in real time upon a flight of the aircraft A according to said intermediate approach phase Phi, by using current values for at least some of the parameters received from the set 4. In such second embodiment, said aircraft guidance system 7 can comprise means 11 which are connected through a connection 12 to said means 5 and are formed so as to guide the aircraft A automatically so that it observes the vertical profile PV determined in real time by the means 5.

In such second embodiment, the device 1 can comprise in addition usual means 13 so as to implement at least one particular guiding function, for example a function ASPA S&M. These means 13 are for instance connected by a connection 14 to said means 11. If, during a intermediate approach phase PHi, during which the aircraft A is guided by the means 11 so as to observe the vertical profile PV determined in real time by the means 5, the guiding function implemented by the means 13 is engaged, the guidance performed by said means 11 is suspended and the aircraft A is guided according to said means 13. In this case, imposed constraints (altitude or speed) thus have priority with respect to a targeted deceleration.

Therefore, when upon an intermediate approach phase PHi, during which the aircraft A is guided so as to observe the vertical profile, the function ASPA S & M is engaged, it exceeds the published constraint of deceleration. In this case, the function ASPA S&M only have in general a reduced impact and is only used to adjust the speed of the follower aircraft with respect to the speed of the leader aircraft, for small deviations caused by slight prediction errors.

The invention claimed is:

1. A method for aiding piloting of an aircraft during an intermediate approach phase of a descent of the aircraft, the method comprising:
   (a) receiving, by a flight management system, values of parameters relative to the aircraft and a flight thereof;
   (b) determining, by the flight management system and based on the received values, a vertical profile comprising an adaptive slope, wherein the adaptive slope defines a descent path having a plurality of slope values for the aircraft to observe throughout the intermediate approach phase and thereby enables the aircraft to hold a constant deceleration rate during the intermediate approach phase;
   (c) automatically implementing control of the aircraft, by an aircraft guidance system, so that the aircraft observes the adaptive slope of the vertical profile throughout the intermediate approach phase and thereby maintains the constant deceleration rate during the intermediate approach phase; and
   (d) maintaining a fixed thrust, by the aircraft guidance system, throughout the intermediate approach phase.

2. The method according to claim 1, wherein the parameters comprise at least some of the following data:
   the aerodynamic configuration of the aircraft;
   the speed of the aircraft;
   the mass of the aircraft; and
   environmental conditions, in which the flight of the aircraft is performed.

3. The method according to claim 1, wherein the intermediate approach phase starts after a first approach phase during which the aircraft maintains a constant speed and ends when a landing path of a final approach phase with no level portion is reached.

4. The method according to claim 1, wherein the steps (a) and (b) are implemented before the aircraft enters the intermediate approach phase, so as to perform a prediction of the vertical profile in the intermediate approach phase.

5. The method according to claim 1, wherein step (b) is implemented in real time during the aircraft being in the intermediate approach phase, and, at step (c), the aircraft is automatically controlled so as to observe the adaptive slope of the vertical profile being determined in real time at step (b).

6. The method according to claim 5, further comprising:
   suspending automated control of the aircraft so as to observe the adaptive slope of the vertical profile if, during the intermediate approach phase, a different guiding function is engaged; and
   automatically controlling the aircraft according to the different guidance function.

7. The method according to claim 1, wherein the vertical profile consists of one non linear deceleration segment, and wherein a slope for the segment is adapted on a continuous way.

8. The method according to claim 1, wherein the vertical profile comprises a succession of linear deceleration segments, each segment having a particular slope for guiding the aircraft during the intermediate approach phase.

9. The method according to claim 1, wherein the aircraft is a first aircraft following a second aircraft with both of the first and second aircrafts preparing for landing at a same airport, and the adaptive slope enables a separation in constant time to be held between the first aircraft and the second aircraft.

10. A device for aiding piloting of an aircraft during an intermediate approach phase of a descent of the aircraft, the device comprising:
    a flight management system that receives values of parameters relative to the aircraft and a flight thereof and, based on the received values, determines a vertical profile comprising an adaptive slope, wherein the adaptive slope defines a descent path having a plurality of slope values for the aircraft to observe throughout the intermediate approach phase and thereby enables the aircraft to hold a constant deceleration rate during said intermediate approach phase; and
    an aircraft guidance system that automatically implements control of the aircraft so that the aircraft observes the adaptive slope of the vertical profile throughout the intermediate approach phase and thereby maintains the constant deceleration rate during the intermediate approach phase, the aircraft guidance system controlling the aircraft so that the aircraft maintains a fixed thrust throughout the intermediate approach phase.

11. An aircraft comprising:
a device such as specified in claim 10.

* * * * *